Oct. 13, 1925.
A. R. LOGUE
1,557,070
TRAVELING HOIST
Filed May 5, 1924
2 Sheets-Sheet 1
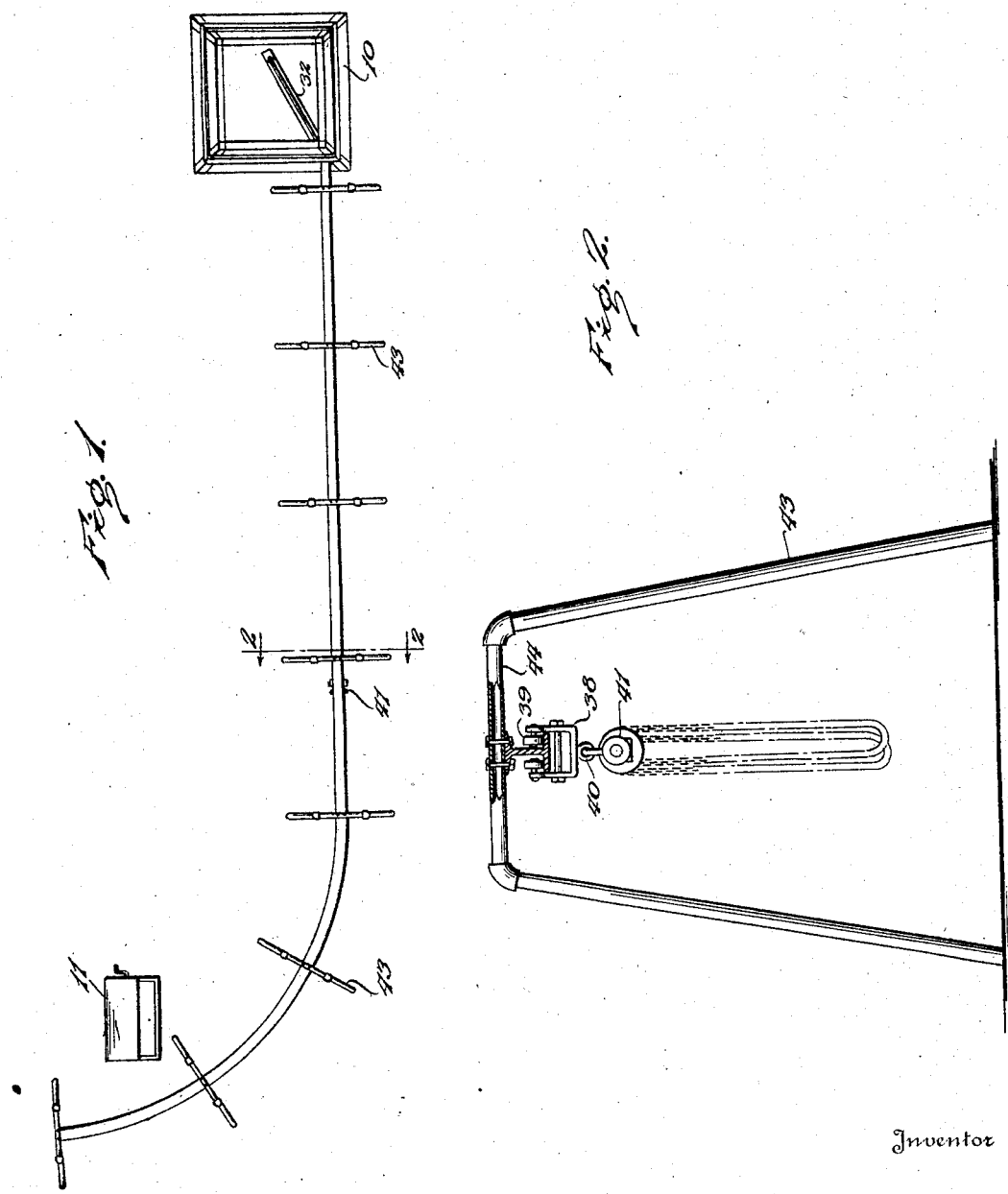
Inventor
A. R. Logue
By Lacy & Lacy, Attorneys

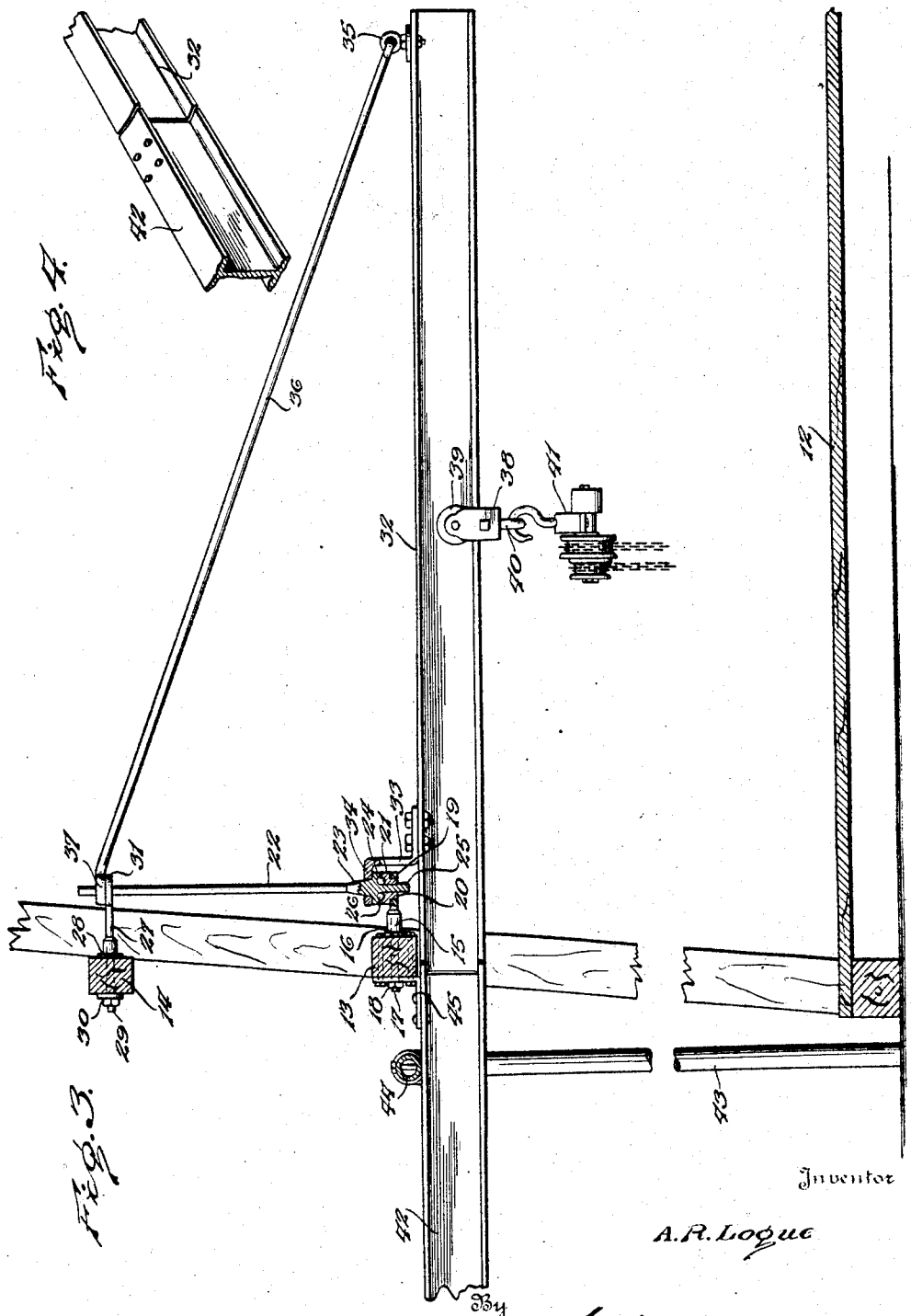

Patented Oct. 13, 1925.

1,557,070

UNITED STATES PATENT OFFICE.

ALVIN R. LOGUE, OF TULSA, OKLAHOMA.

TRAVELING HOIST.

Application filed May 5, 1924. Serial No. 711,174.

*To all whom it may concern:*

Be it known that I, ALVIN R. LOGUE, a citizen of the United States, residing at Tulsa, in the county of Tulsa and State of Oklahoma, have invented certain new and useful Improvements in Traveling Hoists, of which the following is a specification.

This invention relates to an improved traveling hoist particularly designed for use in connection with deep well drilling operations and seeks to provide a means whereby the well drilling tools may be conveniently lifted from the floor of a derrick and transported to a forge to be sharpened or repaired when the tools may be as easily and quickly returned to the derrick.

Other and incidental objects will appear hereinafter.

In the drawings:

Figure 1 is a plan view showing my improved hoist in connection with a conventional derrick and forge.

Figure 2 is a detail sectional view on the line 2—2 of Figure 1, looking in the direction of the arrows, Figure 3 is an enlarged elevation particularly showing the swinging arm employed in conjunction with the overhead track rail of the hoist, and Figure 4 is a detail perspective view showing the joint between the rail and arm.

Referring now more particularly to the drawings, I have, for convenience, shown my improved hoist in connection with a conventional well derrick 10 and forge 11, the forge being, as is usual, located some distance from the derrick. The floor of the derrick is indicated at 12 and for the purposes of the present invention, I erect between the uprights at one side of the derrick, a horizontal cross beam 13 about which is arranged a second cross beam 14. Bolted to the beam 13 is a bracket 15 having a base 16 resting flat against the inner face of said beam and extending from said plate through the beam is a shank 17 accommodating a nut 18 securing the bracket in position. Formed on the bracket at its forward end is an eye 19 and removably fitting snugly in said eye is a bearing 20 provided at its upper end with a flange 21 resting against the upper side of the eye. Associated with said bearing is a shaft 22 provided near its lower end with a cone 23 flanged to form a bearing 24 and provided at its base end with a pintle 25 journaled through the bearing 21. The confronting bearings 21 and 24 are provided with mating races and fitting in said races to coact between said bearings is a plurality of balls 26 supporting the shaft for free rotation. Mounted upon the beam 14 is a bracket 27 provided with a base 28 resting against the inner side of said beam and projecting from said base is a shank 29 extending through the beam to accommodate a nut 30 securing the bracket in place. Formed on the bracket at its forward end is an eye 31 journaling the shaft 22 near its upper end so that the shaft will thus be rigidly sustained in vertical position and supported by said shaft in parallel relation to the floor 12 of the derrick is a swinging arm or boom 32. This arm is formed from a length of suitable I-beam and bolted to the upper flange of the arm near the rear end thereof, is a bracket 33 terminating in an eye 34 wedged over the cone 23 of the shaft 22 for connecting the arm with said shaft. Mounted upon the arm near its forward end is an eye bolt 35 to which is connected a hanger rod 36 provided at its rear end with an eye 37 fitting over the upper end of the shaft 22. Thus, the bracket 33 and rod 36 will serve to rigidly connect the arm with the shaft 22 to be supported thereby to swing horizontally above the floor of the derrick. Freely movable along the arm is a trolley including a yoke 38 straddling the lower flange of the arm and carried by the ends of said yoke are rollers 39 resting against the upper face of said flange at opposite sides of the arm. The yoke is equipped with an eye 40 and removably engaged through said eye is the hook of an appropriate hoist 41.

The arm 32 forms the inner section of an overhead track. This track consists of a rail 42 which is formed of I-beam like the I-beam employed in the arm 22, and supporting said rail is a plurality of spaced trestles 43, the track being curved, as shown in Figure 1, to extend adjacent the forge 11. The trestles may be formed of suitable pipe and each includes a pair of downwardly divergent legs sunk in the ground and connecting said legs at their upper ends is a cross pipe 44, the upper flange of the rail 42 being bolted to the cross pipes of the several trestles. Connecting the inner end of the rail 42 with the beam 13 upon the derrick is an angle plate 45 securing said end of the rail to mate with the adjacent end of the arm 32, and, as shown in detail in Figure 4, the mating ends of the rail and arm are curved on an arc having the shaft 22 as its center to thus permit free swinging movement of the arm.

As will now be seen in view of the foregoing, the arm 32 may be swung from one side to the other and thus positioned so that the well drilling tools may be lifted from the derrick floor by means of the hoist 41 when the trolley may then be manually moved along the arm to the track rail 42 and along said rail for transporting the tools to the forge. Similarly, the tools may be returned from the forge to the derrick and a great saving in time and labor effected.

Having thus described the invention, what is claimed as new is:

1. In a traveling hoist, spaced brackets, a bearing carried by one of said brackets, a rotatable shaft carried by the brackets and provided with a bearing to confront said first mentioned bearing, anti-friction devices interposed between said bearings sustaining the shaft for free rotation, and a boom swingingly supported by said shaft.

2. In a traveling hoist, a vertical rotatable shaft provided near one end with a cone, a boom, a bracket upon the inner end portion of said boom and provided with an eye wedged over said cone, and a hanger rod extending between the opposite end portion of the shaft and the outer end portion of the boom cooperating with said bracket to connect the boom with the shaft supported thereby to swing horizontally.

In testimony whereof I affix my signature.

ALVIN R. LOGUE. [L. S.]